(12) United States Patent
Wasko et al.

(10) Patent No.: US 12,532,279 B2
(45) Date of Patent: Jan. 20, 2026

(54) SCHEDULING 5G FUNCTIONS USING A NETWORK ADAPTER

(71) Applicant: MELLANOX TECHNOLOGIES, LTD., Yokneam (IL)

(72) Inventors: Wojciech Wasko, Mlynek (PL); Dotan David Levi, Kiryat Motzkin (IL); Natan Manevich, Migdal HaEmek (IL); Timothy James Martin, San Marcos, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 56 days.

(21) Appl. No.: 17/675,548

(22) Filed: Feb. 18, 2022

(65) Prior Publication Data

US 2023/0269684 A1    Aug. 24, 2023

(51) Int. Cl.
*H04W 56/00* (2009.01)
(52) U.S. Cl.
CPC ............... *H04W 56/0045* (2013.01)
(58) Field of Classification Search
None
See application file for complete search history.

(56) References Cited

U.S. PATENT DOCUMENTS

| | | | | |
|---|---|---|---|---|
| 6,199,169 | B1 * | 3/2001 | Voth | G06F 1/14 713/400 |
| 6,490,727 | B1 * | 12/2002 | Nazarathy | H04J 14/0282 348/E7.071 |
| 7,483,448 | B2 * | 1/2009 | Bhandari | H04J 3/0682 370/510 |
| 8,370,675 | B2 * | 2/2013 | Kagan | H04J 3/0697 713/400 |
| 9,019,996 | B2 * | 4/2015 | Fourcand | H04J 3/0682 370/503 |
| 9,344,265 | B2 * | 5/2016 | Karnes | H04L 12/4641 |
| 10,444,788 | B2 * | 10/2019 | Carlstedt | H04W 56/0015 |
| 11,070,304 | B1 * | 7/2021 | Levi | H04J 3/0673 |
| 2002/0073228 | A1 * | 6/2002 | Cognet | H04L 9/40 709/236 |
| 2004/0111549 | A1 * | 6/2004 | Connor | G06F 13/24 710/260 |

(Continued)

FOREIGN PATENT DOCUMENTS

| | | |
|---|---|---|
| CN | 101536385 | 9/2009 |
| CN | 108023762 | 5/2018 |
| CN | 211207146 | 8/2020 |

OTHER PUBLICATIONS

Official Action with Machine Translation for China Patent Application No. 202310099741.9, dated Nov. 20, 2025, 24 pages.

*Primary Examiner* — Wutchung Chu
*Assistant Examiner* — Berhanu D Belete
(74) *Attorney, Agent, or Firm* — Sheridan Ross P.C.

(57) ABSTRACT

A network adapter comprises an output that couples to a central processing unit (CPU) of a network device, a first clock coupled to the output and configured to be synchronized with a second clock that is external to the CPU and the network adapter, and circuitry coupled to the first clock. The circuitry is configured to generate, using the synchronized first clock, a tick at a time offset from a timeslot of a radio schedule for a radio unit and send the tick to the output.

20 Claims, 7 Drawing Sheets

(56) References Cited

U.S. PATENT DOCUMENTS

| | | | |
|---|---|---|---|
| 2008/0225899 A1* | 9/2008 | Rabenko | H04J 3/0664 370/503 |
| 2009/0016474 A1* | 1/2009 | Bertorelle | H04W 56/0035 375/356 |
| 2010/0017634 A1* | 1/2010 | Chen | G06F 1/3203 713/400 |
| 2010/0189206 A1* | 7/2010 | Kagan | H04J 3/0697 375/354 |
| 2010/0316069 A1* | 12/2010 | Fourcand | H04J 3/0605 370/503 |
| 2015/0189611 A1* | 7/2015 | Charles | H04L 7/048 370/350 |
| 2016/0309434 A1* | 10/2016 | Regev | H04L 43/106 |
| 2017/0251488 A1* | 8/2017 | Urban | H04W 56/001 |
| 2018/0348376 A1* | 12/2018 | Derbez | G01S 19/23 |
| 2019/0064873 A1* | 2/2019 | Carlstedt | G06F 1/12 |
| 2019/0141016 A1* | 5/2019 | Borrill | H04L 9/12 |
| 2019/0319730 A1* | 10/2019 | Webb | H04L 12/40169 |
| 2020/0133328 A1* | 4/2020 | Chen | G06F 1/329 |
| 2020/0252320 A1* | 8/2020 | Zemach | H04L 63/0428 |
| 2020/0344333 A1* | 10/2020 | Hawari | H04J 3/0667 |
| 2020/0367970 A1* | 11/2020 | Qiu | A61B 90/36 |
| 2020/0401434 A1* | 12/2020 | Thampi | H04J 3/0667 |
| 2021/0141413 A1* | 5/2021 | Levi | G06F 1/14 |
| 2021/0183409 A1* | 6/2021 | Gomberg | G11B 27/10 |
| 2021/0270993 A1* | 9/2021 | Cederwall | G08B 21/182 |
| 2021/0297151 A1* | 9/2021 | Levi | H04W 72/0446 |
| 2021/0306262 A1* | 9/2021 | Shmatko | H04L 67/56 |
| 2021/0306910 A1* | 9/2021 | Guo | H04W 28/0908 |
| 2021/0337498 A1* | 10/2021 | Lee | H04J 3/0664 |
| 2021/0400610 A1* | 12/2021 | Aijaz | H04L 7/0012 |
| 2022/0116473 A1* | 4/2022 | Levi | H04W 72/1263 |
| 2022/0141790 A1* | 5/2022 | Kasichainula | H04W 56/0015 370/350 |
| 2022/0148623 A1* | 5/2022 | Gomberg | H04N 5/765 |
| 2022/0248354 A1* | 8/2022 | Aijaz | H04W 56/004 |
| 2022/0357763 A1* | 11/2022 | Levy | H04L 7/0012 |
| 2023/0104174 A1* | 4/2023 | Ahn | G06F 3/011 713/400 |

* cited by examiner

SCHEDULING 5G FUNCTIONS USING A NETWORK ADAPTER

The project leading to this application has received funding from the European Union's Horizon 2020 research and innovation program under grant agreement No 957403.

FIELD OF THE DISCLOSURE

The present disclosure is generally directed to systems, devices, and methods for scheduling 5G functions using a network adapter.

BACKGROUND 5G networks transmit and receive data over the air within discrete timeslots of a schedule for a radio unit used to transmit and receive the data. Meanwhile, the baseband processing layer of the network may schedule transmit and receive operations for the radio unit based on the timeslots of the radio schedule.

BRIEF SUMMARY

In an illustrative embodiment, a network adapter comprises an output that couples to a central processing unit (CPU) of a network device; a first clock coupled to the output and configured to be synchronized with a second clock that is external to the CPU and the network adapter; and circuitry coupled to the first clock and configured to: generate, using the synchronized first clock, a tick at a time offset from a timeslot of a radio schedule for a radio unit; and send the tick to the output.

In another illustrative embodiment, a network device comprises a CPU; and a network adapter including: an output that couples to the CPU; a first clock coupled to the output and configured to be synchronized with a second clock that is external to the network adapter and the CPU; and circuitry coupled to the first clock and configured to: generate, using the synchronized first clock, a tick at a time offset from a timeslot of a radio schedule for a radio unit; and send the tick to the CPU through the output to cause the CPU to initiate one or more scheduling operations for the timeslot.

In another illustrative embodiment, a method comprises synchronizing a first clock of a network adapter with a second clock that is external to the network adapter; generating, by circuitry of the network adapter and using the synchronized first clock, a tick at a time offset from a timeslot of a radio schedule for a radio unit; and sending, by the circuitry, the tick to at least one CPU of a network device coupled to the network adapter.

Additional features and advantages are described herein and will be apparent from the following Description and the figures.

Figure 1:
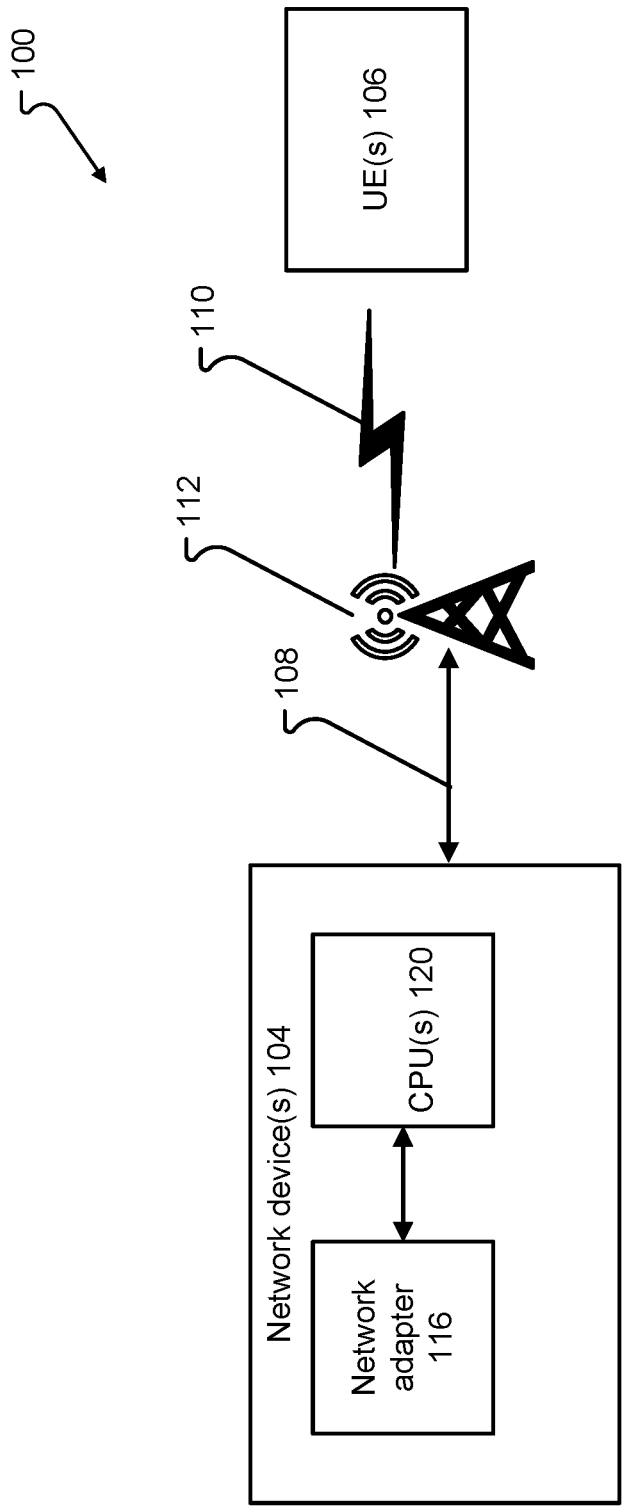
FIG. 1 illustrates a system according to at least one example embodiment.

DETAILED DESCRIPTION 5G networks utilize radio units (i.e., cellular towers) that transmit and receive data within discrete timeslots. The timeslots dictate various aspects for 5G baseband processing in that a baseband processor that schedules data transmission and reception on behalf of the radio units requires precise knowledge of the timeslots. For example, about one millisecond prior to a radio unit sending data towards user equipment (UE), a scheduling layer (e.g., with layer 2 functions) within the baseband processor schedules the transmission for a particular timeslot and requests that the transmission layer (e.g., with layer 1 functions) of the baseband processor perform the necessary calculations to encode the data into physical symbols that are then transmitted over the air by the radio unit.

Some techniques employ software-defined 5G baseband processing to notify the scheduler of elapsed time slots. For example, a work scheduler in layer 2 may periodically launch the necessary layer-1 processing. The periodicity of this system may be provided by layer 1 generating a notification, or tick, each time a timeslot elapses and sending the tick to layer 2. One technique for accomplishing this feature within devices that include network adapters (e.g., network interface controllers (NICs)) involves running at least three threads on the central processing unit (CPU) of a network device connected to the network adapter: a first thread to control the synchronization of a network adapter to a reference time; a second thread to synchronize the internal CPU clock to the network adapter's clock; and a third thread to determine when a scheduling period has elapsed, i.e., when a "tick" should be generated. Of these three threads, the third thread is the most resource consuming and latency-sensitive. For example, if the third thread is temporarily descheduled and misses the scheduling period elapsing, the tick generated by layer 1 will be late which may result in too little time to perform the necessary operations (both in the layer 2 scheduling and in the resulting layer 1 calculations). As a result, transmission may be delayed or incomplete which reduces the efficiency of the network. In order to make the tick as accurate as possible, some systems sacrifice an entire CPU core just to check CPU time in a tight loop and generate a tick when a scheduling period has elapsed. This approach is wasteful both in terms of consuming CPU resources available for other tasks as well as power consumption.

Moreover, on some platforms, NIC to CPU clock synchronization (the second thread mentioned above) carries some inaccuracies and is resource consuming. Notably, apart from the application that manages the synchronization, there are background kernel threads involved in that task which again exacerbates the problem of resource usage.

Inventive concepts propose to address at least the above-described problems by taking advantage of the precise time information already available to a NIC (thanks to synchronization with a radio unit via precision time protocol (PTP), for example). That is, example embodiments propose using a network adapter, such as a NIC, to generate 5G scheduling ticks. In operation, an orchestration layer within a CPU having baseband processing functionality requests periodic ticks from the NIC (requests for ticks at a specific time or list of times are also possible). Upon that request, the NIC will generate an interrupt for the CPU at every tick, and each tick may be generated and sent to the CPU at a time offset (e.g., a predetermined time or timing offset or a time offset determined on the fly) from a timeslot used by a radio unit to send and receive data. This tick interrupt is routed to the CPU connected to the NIC without delay in a dedicated routine, such as, a tick handler. The tick handler may then spawn 5G layer 2 scheduling tasks without the need to involve the operating system scheduler and/or without the need to switch the context to user space. As may be appreciated, inventive concepts may eliminate the need to have a dedicated CPU thread continuously checking current CPU time to detect scheduling period lapses and/or eliminate the need for precise NIC-CPU clock synchronization because these functions are offloaded to the NIC.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

FIG. 1 illustrates a system 100 according to at least one example embodiment. The system 100 may correspond to a system for 5G cellular communication and include one or more network devices 104, user equipment (UEs) 106, communication networks 108 and 110, and a radio unit (RU) 112. In at least one example embodiment, a network device 104 may correspond a network switch (e.g., an Ethernet switch), a collection of network switches, or other suitable device or collection of devices used to control the flow of data within the system 100. Each network device 104 may be connected to one or more of Personal Computer (PC), a laptop, a tablet, a smartphone, a server, a collection of servers, or the like. In one specific, but non-limiting example, each network device 104 is connected to a server or collection of servers that transmit and receive data.

Examples of the communication networks 108 and/or 110 that may be used within the system 100 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables wired communication between the network devices 104 and the RU 112 with electrical and/or optical signals while the communication network 110 is a network that enables wireless communication (e.g., according to cellular protocols such as 5G, LTE, 3G and/or the like) between the RU 112 and UE(s) 106.

The one or more network devices 104 may include or be in communication with a network adapter 116, such as a network interface card or network interface controller (NIC). The one or more network devices 104 may include or be in communication with one or more CPUs 120. In one non-limiting example, the CPU(s) 120 function, at least in part, as baseband processors (also called baseband units (BBUs)) that provide various functionality for transmitting and receiving data within the system 100. As described in more detail below, the network adapter 116 may serve as a tick generator that notifies a CPU 120 of when to initiate scheduling operations. In addition to providing baseband processing functions, each CPU 120 may provide processing resources for one or more virtual machines (VMs) executing one or more applications. One or more of the CPUs 120 may correspond to ARM-based processors while one or more of the CPUs 120 may correspond to x86-based processors.

The network adapter 116 and the CPU(s) 120 may include storage devices and/or processing circuitry for carrying out computing tasks, for example, tasks associated with controlling the flow of data within the system 100. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

Although not explicitly shown, it should be appreciated that the network device 104 may include other processing devices, storage devices, and/or communication interfaces generally associated with computing tasks, such as sending, receiving, and processing data.

Figure 2:
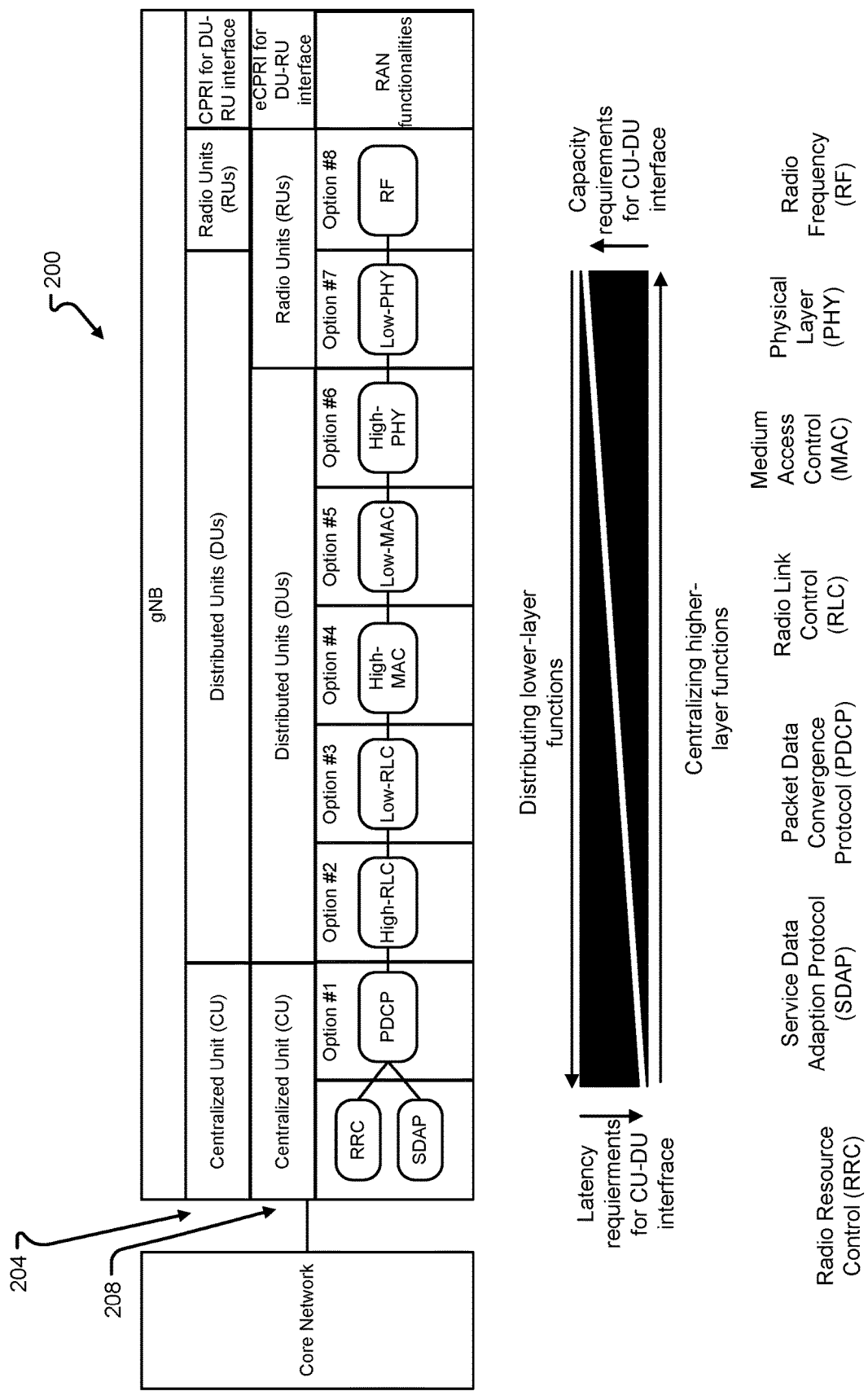
FIG. 2 illustrates a graphic for explaining possible configurations of a 5G network according to at least one example embodiment.
Figure 3:
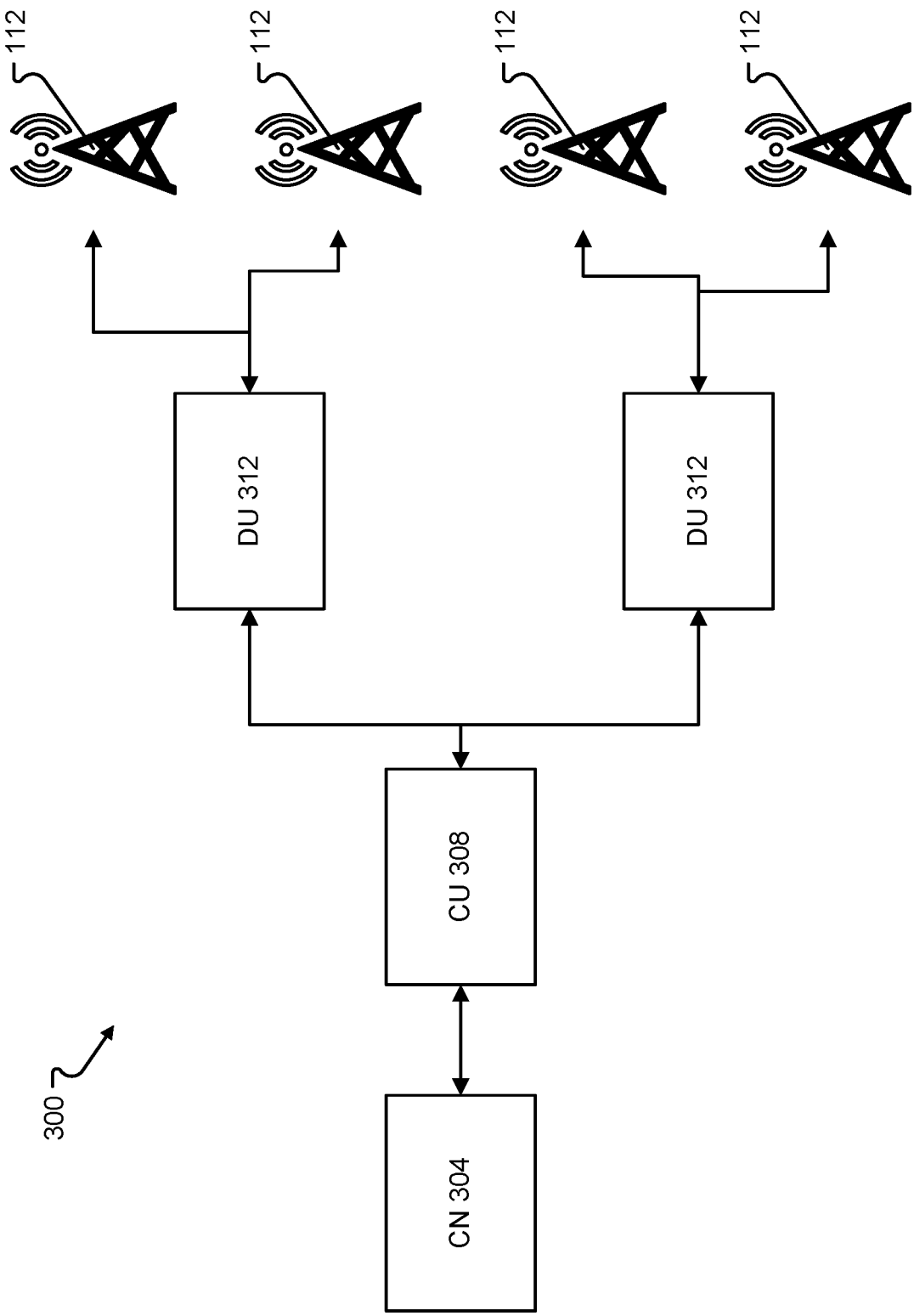
FIG. 3 illustrates an example implementation of a disaggregated network according to at least one example embodiment.

FIG. 2 illustrates a graphic 200 for explaining possible configurations of a 5G network while FIG. 3 illustrates an example implementation of a disaggregated network 300. As may be appreciated from the graphic 200, a logical node gNB within a 5G network may be connected to a core network (CN) and include multiple units arranged in one of the configurations 204 or 208. In general, the units may include a centralized unit (CU), a distributed unit (DU), and a radio unit (RU) that carryout the various operations listed in options 1 to 8 for the logical node gNB. As shown, a configuration of the logical node gNB is defined by the various layer functions labeled in options 1 to 8. For example, in configurations 204 and 208, the CU may carry out RRC, SDAP, and PDCP functions. In configurations 204 and 208, a DU may carryout high-RLC (radio link control) functions, low-RLC functions, high-MAC functions, low-MAC functions, and high-physical layer (PHY) functions. As shown for configuration 204, a DU may further carryout low-PHY functions while an RU carries out RF functions. Meanwhile, an RU in configuration 208 may carry out low-PHY and RF functions. As also shown, the logical node gNB may further include a common public radio interface CPRI and/or an eCPRI for carrying out radio access network (RAN) functions. The graphic 200 further illustrates various trade-offs between latency requirements and capacity requirements of a CU-DU interface as the functionality of the logical node gNB becomes more distributed or more centralized.

The disaggregated network 300 in FIG. 3 includes a core network (CN) 304, a CU 308, Dus 312 and RUs 112. As may be appreciated, CU 308, Dus 312, and RUs 112 may be included in one or more logical nodes gNB in FIG. 2.

Figure 4:
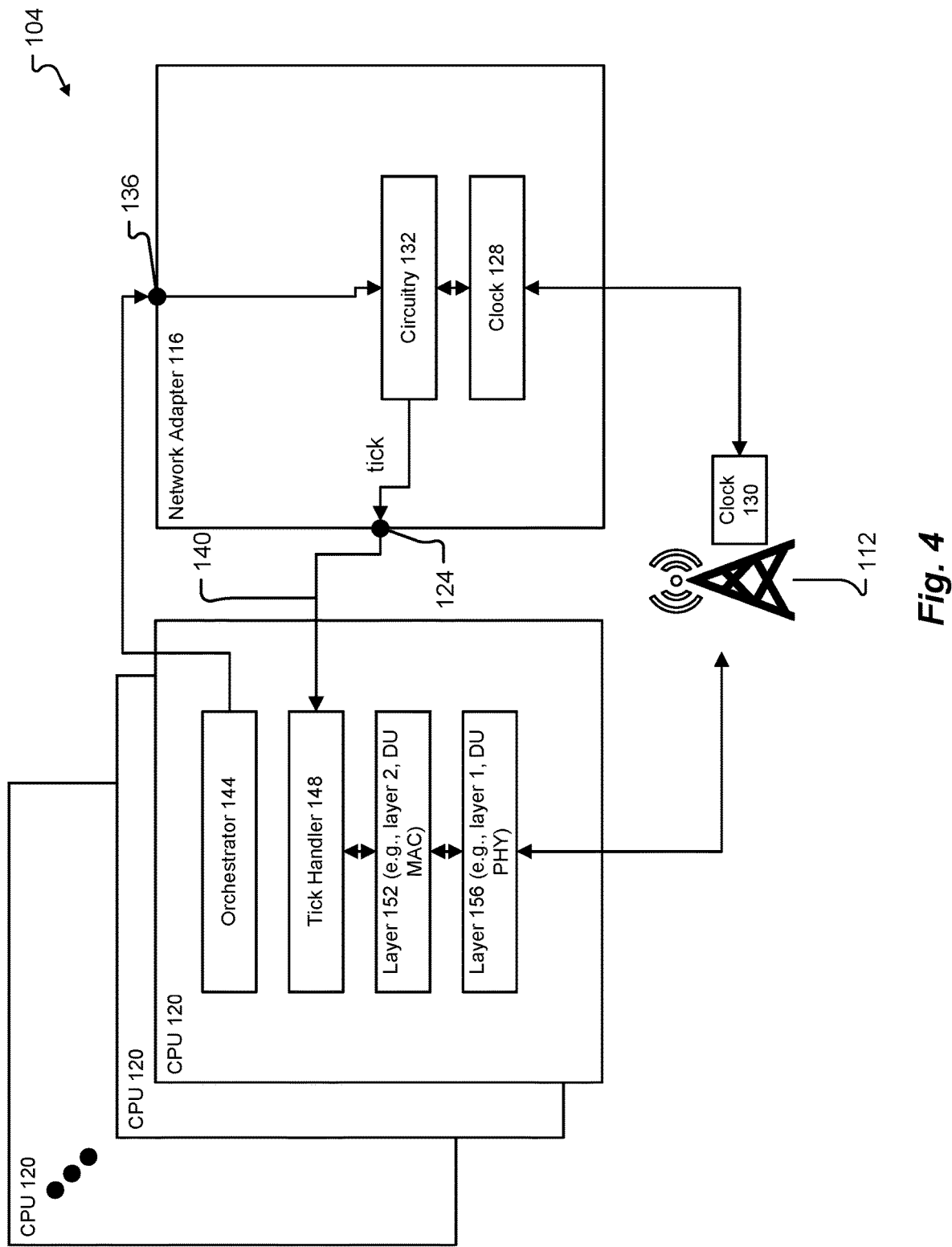
FIG. 4 illustrates additional details of the system in FIG. 1 according to at least one example embodiment.

FIG. 4 illustrates additional details of the system 100, and in particular, additional details for the network device 104 that enable tick generation for a 5G communication network.

As shown in FIG. 4, a network adapter 116, such as a NIC, may include an output 124 that couples to one or more CPUs 120 (also called CPUs 120) of a network device 104. The output 124 may be coupled to the CPUs 120 upon connection of the network adapter 116 to a slot (e.g., a PCIe slot) of the network device 104. Although not shown, a CPU 120 may be communicatively coupled with one or more servers, network switches, or other suitable device for generating and/or routing traffic within a cellular network. In at least one embodiment, a CPU 120 executes one or more applications for a virtual machine.

The network adapter 116 may include a first clock 128 coupled to the output 124. The first clock 128 is configured to be synchronized with a second clock 130 that is external to the network device 104. In at least one embodiment, the first clock 128 is initially synchronized with the second clock 130 for the purpose of the network adapter 116 carrying out one or more functions on behalf of the CPUs 120 not related to tick generation. Accordingly, at least one inventive concept proposes to use the already synchronized clock 128 to generate ticks that trigger layer 2 scheduling operations within the CPU 120 for scheduling signal transmission and reception operations for the RU 112. As a result, a CPU 120 avoids using processing resources to track CPU time for the purpose of generating a tick to trigger a scheduling period, which in turn frees up CPU resources for other tasks and/or reduces power consumption. As discussed in more detail below, a scheduling period may be triggered according to received ticks that are generated by the circuitry 132 at a time offset from a timeslot during which signals are transmitted and/or received at an RU 112. The clocks 128 and 130 may be coupled to one another with a suitable hard-wired connection (e.g., an electrical connection).

The second clock 130 may be external to the network adapter and the CPU 120 and/or external to the network device 104. The second clock 130 is integrated with or otherwise in communication with the RU 112 and used control timing of various functions for RU 112 (e.g., signal transmission and/or signal reception functions of the RU 112). The first clock 128 and the second clock 130 may be synchronized with one another according to a suitable protocol, such as precision time protocol (PTP) or network time protocol (NTP). In at least one embodiment, the first clock 128 and the second clock 130 may be independently synchronized to a third clock, such as a global navigation satellite system (GNSS) signal. Each clock may be generated in a suitable manner, such as with a phase locked loop (PLL) circuit.

Here, it should be appreciated that synchronizing two clocks may include matching characteristics of the clock being synchronized with another clock. For example, when synchronizing clock 128 with clock 130, one or more of the duty cycle, period (or frequency), and/or amplitude of clock 128 may be controlled to match one or more of the duty cycle, period (or frequency), and/or minimum and maximum amplitudes of clock 130. In at least one embodiment, for instance, the clock 128 may be controlled to have the same frequency as clock 130. In another example, the characteristics (duty cycle, period, min/max amplitude, and the like) between clocks do not necessarily have to match, but may instead have some known relationship that enables each clock to have knowledge about the characteristics of another clock. For example, synchronizing clock 128 with clock 130 may include providing clock 128 with information about the characteristics (duty cycle, period, min/max amplitude) of clock 130 such that clock 128 knows its timing relative to the timing of clock 130, which effectively synchronizes clock 128 to clock 130. The network adapter 116 may further include circuitry 132 coupled to the first clock 128 that generates a tick at a time offset from at least one timeslot and sends the tick to the output 124. The circuitry 132 may generate the tick as an interrupt that prompts tick handler 148 to initiating layer 2 scheduling tasks, potentially without needing to involve the operating system scheduler and/or without switching to a user space context. In other words, the tick serves as an interrupt for the CPU 120 that initiates one or more scheduling operations at the CPU 120 for scheduling transmission or reception of data from and to RU 112. The interrupt may be a message signaled interrupt (e.g., an MSI or MSI-X interrupt) sent over channel 140 implemented with PCIe bus to a specific core of the CPU 120 (where the specific core is determined by interrupt affinity mechanisms in hardware). Thus, the circuitry 132 includes suitable hardware and/or software for generating this "tick interrupt" at a time offset from a timeslot. In at least one embodiment, the interrupt may correspond to an INTx interrupt sent over a PCI bus or other suitable interrupt sent over another suitable medium.

As may be appreciated, interrupts do not generally carry auxiliary information. In one embodiment, however, a non-standard-conforming implementation of a tick may include auxiliary information in the interrupt itself. Additionally or alternatively, mechanisms other than interrupts may be used to communicate a tick from the circuitry 132 to the CPU 120, where such mechanisms enable communication of the tick along with auxiliary information. For example, example embodiments may employ specialized CPU instructions that suspend the execution of the program on the CPU 120 until a memory location changes its value. For example, x86 processors include a MONITOR/MWAIT instruction which will "suspend" the CPU 120 until a memory referenced by address given to the MONITOR/MWAIT instructions changes value. In this case, the tick is implemented as a memory write from the circuitry 132 which changes the value in the memory and causes the CPU 120 to resume operation. In this scenario, the value written by the NIC 116 to the memory of CPU 120 may carry some auxiliary information. The auxiliary information may include the time at which the tick was generated or should have been generated and/or opaque data that was provided to the circuitry 132 by the CPU 120 when requesting the ticks. For example, a CPU 120 may request two types of ticks—a set of ticks $T_A$ at 500 us intervals that carry information "A" and another set of ticks $T_B$ at 125 us intervals that carry information "B" so that the CPU 120 can distinguish between ticks "$T_A$" and "$T_B$."

As may be appreciated, MONITOR/MWAIT is a privileged instruction and a kernel space solution. However, this instruction enables the network adapter 116 to package auxiliary information with the tick while still conforming to transmission standards (e.g., PCIe standards).

In at least one embodiment, a tick may be implemented with UMONITOR/UMWAIT instructions that achieve the same goal as MONITOR/MWAIT instructions except that UMONITOR/UMWAIT instructions enable an application to request that the CPU 120 to suspend the instruction's execution until a memory location changes value. In this case, the tick can be delivered by the circuitry 132 directly to the application of the CPU 120 while bypassing the kernel space. Below is an example mode of operation of a 5G L2 scheduler:

preconfigured memory address, In another example, the tick is a posted memory write to a preconfigured memory address. In any event, a value used for the memory write may be a preconfigured value (e.g., selected at random), the actual time of tick generation (e.g., in clock time), and/or a sequence number of the tick in a sequence of ticks.

In accordance with example embodiments, a timeslot may be used to transmit or receive data and/or control signals from or to the RU 112. Accordingly, a duration of a time slot is based on a standard used for wireless communication. In at least one embodiment, the standard corresponds to a standard or standards used for wireless communication in a 5G cellular network. As may be appreciated, the timeslot may be one of multiple timeslots, and the circuitry 132 may generate ticks at time offsets from selected ones of the multiple timeslots. The duration of a timeslot may depend on the timing scheme being employed by a cellular 5G network. For example, each timeslot may have a duration of 1 ms, 500 µs, 250 µs, 125 µs, 62.5 µs, or other suitable timeslot duration used for transmitting and receiving signals from an RU 112. Notably, clock frequencies of the synchronized clocks 128 and 130 may be the same and have a known relationship with a timeslot. For example, on-off periods of clock 128 may have durations that match the duration of a timeslot or that are some multiple of the duration of the timeslot so that the circuitry 132 knows when to generate a tick based on a frequency of the clock 128.

The CPU 120 includes layers 152 and 156 that are embodied with suitable hardware and/or software for carrying out layer 2 and layer 1 functions, respectively. For example, with reference to FIGS. 2-4, layer 152 may be included in a DU 312 and perform layer 2 functions (or data link layer functions), which may include MAC functions, RLC functions, and/or the like. Meanwhile, layer 156 may be included in a DU 312 and perform layer 1 functions (or physical layer PHY functions), which may include low-PHY and/or RF functions (e.g., coding functions). In accordance with example embodiments, a CPU 120 uses the accurate timing knowledge of received ticks to trigger layer 2 scheduling operations. Consider an example where a timeslot duration is 500 µs and the CPU 120 needs 1 ms to schedule and code data for sending to a UE 106. In this case, reception of a tick by the tick handler 148 may trigger scheduling and coding operations in layers 152 and 156 so that the data is scheduled, coded, and transmitted two timeslots (or 1 ms) after the initial timeslot.

The network adapter 116 may further include an input 136 configured to receive a request from the CPU(s) 120 that prompts the circuitry 132 to generating the tick. In at least one example embodiment, an orchestrator 144 of a CPU 120

```
L2_scheduler:
   configure_NIC_ticks(mem_addr, interval)
    Forever:
      clear(mem_addr)
      UMONITOR(mem_addr)
      UMWAIT(mem_addr)
      // at this point the CPU execution is suspended until memory at mem_addr
changes value
      tick_info = load(mem_addr)
      Do_L2_scheduling(tick_info)
```

As may be appreciated, the above UMONITOR/UMWAIT implementation of a tick is contained entirely within user space. In one example of the instruction-based tick implementation, the tick is a non-posted memory write to a sends the request upon connection of the input 136 to the CPU 120 (e.g., upon installation of the network adapter 116 into the network device 104). The orchestrator 144 may include suitable hardware and/or software for managing, coordinating, and/or organizing processing resources of a CPU 120. The request may include information related to generating the tick, such as an indication of when and how often to send the tick. In one embodiment, the request includes information that identifies a time offset for sending the tick compared to a timeslot of a radio schedule of an RU 112, a unique identifier of the requesting CPU 120, and/or other information considered useful by the circuitry 132. In at least one embodiment, request includes an indication of a start time for when the circuitry 132 should begin sending ticks (the circuitry 132 may use the start time as a reference time for time-aligning ticks). In general, a single request from the orchestrator 144 to the circuitry 132 is sufficient to ensure that the circuitry 132 sends the tick at a time offset from each timeslot. However, the CPU 120 may send additional requests if, for example, the CPU 120 becomes aware that a change occurs to the duration of the timeslot.

In at least one embodiment, the orchestrator 144 and circuitry 132 may perform a suitable authentication process between one another to ensure that a particular CPU 120 is authorized to begin receiving ticks from the circuitry 132. For example, the network adapter 116 receives a public key from a secure entity, such as the orchestrator 144, a hypervisor, or a suitable network node. The public key may be associated with or generated for a host (e.g., a physical host with a CPU 120 or a virtual machine running on a CPU 120) in communication with the orchestrator 144 where such host is requesting ticks. The public key may be associated with a particular private key, and the network adapter 116 may have knowledge of the public key-private key pair due to a previous registration process with the secure entity. The host may provide its digital signature (e.g., a unique identifier) as part of the host's request to the orchestrator 144 to enable tick generation. The host's digital signature may comprise an identifier that is unique to the host and a private key that is associated with the public key provided to the network adapter 116. The orchestrator 144 may then provide the host's digital signature and the private key to the network adapter 116. The network adapter 116 (e.g., using circuitry 132) may then verify whether the host's signature included or was signed with the private key corresponding to the public key that the network adapter 116 received from the orchestrator 144. If so, the network adapter 116 determines that the host is authorized to receive ticks and begins sending ticks to the host at the requested intervals. If not, the network adapter 116 determines that the host is not authorized to receive ticks and informs the orchestrator 144 of the same. As a result, the network adapter 116 does not provide ticks to the host because the host is not authorized.

In an example with two physical hosts (e.g., a multi-host scenario for an ARM host and an x86 host or two x86 hosts), such hosts may be identifiable based on connections of the hosts to PCIe lanes of the network adapter 116. For example, in the scenario with the ARM host and the x86 host, it may be desirable to restrict tick requests to only the ARM host. It may be determined that the ARM host connects to physical PCIe lanes enumerated as 0 . . . M−1 while the x86 host connects to lanes M . . . N−1 (the PCIe lanes used by the ARM host may be emulated but are still enumerated in some way from the network adapter's 116 perspective). The network adapter 116 may be preconfigured to grant requests for ticks received over the PCIe lanes connected to the ARM host and to reject requests for ticks received over the PCIe lanes connected to the x86 host. Stated another way, the network adapter 116 authorizes requests for ticks received over certain PCIe lanes while rejecting requests for ticks received over other PCIe lanes. Here, it should be appreciated that example embodiments are not limited to PCIe implementations and other suitable host interconnect interfaces may be used such as CXL, NVLink, and/or the like.

In yet another example with multiple VMs coupled to a network adapter 116, the orchestrator 144 or hypervisor may offer the tick functionality to some VMs but not the others. A given VM may use a specific Virtual Function of the network adapter 116 to interact with the network adapter 116. The VM requesting ticks may be identified and authenticated for receiving ticks by checking whether the Virtual Function that received the request at the network adapter 116 is also authorized to receive ticks. If so, the network adapter 116 begins sending ticks to the authenticated VM, and if not, the requesting VM is not authenticated and the network adapter 116 does not send ticks.

As may be appreciated, the CPUs 120 are coupled to the network adapter 116 with a channel 140 that passes the tick from the output 124 to a CPU 120. The channel 140 may correspond to an electrical connection (e.g., a PCI or PCIe bus) or other suitable hard-wired connection (e.g., electrical or optical connection) between the network adapter 116 and the CPUs 120 having the singular purpose of passing ticks. However, example embodiments are not limited thereto, and the channel 140 may pass other signals depending on design preferences (e.g., when the type of interrupt is an in-band MSI-X interrupt). For example, in at least one embodiment, the orchestrator 144 may provide the above-described request for ticks through the channel 140 so that the input 136 may be omitted or bypassed.

Although example embodiments have been discussed with reference to the network adapter 116 generating ticks for a single CPU 120, it should be appreciated that the output 124 of the network adapter 116 may be coupled to one or more additional CPUs 120 to provide the same ticks to the one or more additional CPUs 120 to trigger layer 2 and layer 1 scheduling and coding operations for the one or more additional CPUs 120 in the same manner as described above. In at least one example embodiment, the network adapter 116 provides one or more additional ticks to the one or more additional CPUs 120. That is, each CPU 120 may request the circuitry 132 to send a tick that is specific to a particular CPU 120 so that the ticks are sent to all CPUs 120 according to their desired timing. For example, a first CPU 120 operates according to 500 μs timeslots while a second CPU 120 operates according to 1 ms timeslots. Thus, each CPU 120 may request that the circuitry 132 generate a respective tick according to the different timeslots so that a tick is sent to the first CPU 120 for a 500 μs timeslot while a tick is sent to the second CPU 120 for a 1 ms timeslot. In this scenario, each request received by the circuitry 132 from a CPU 120 may include an identifier of the CPU 120 (e.g., an identifier and/or key of a host noted above, such as a universally unique identifier (UUID)), which enables the circuitry 132 to identify, (optionally) authenticate the CPU 120, and send the appropriate tick to the CPU 120.

Figure 5B:
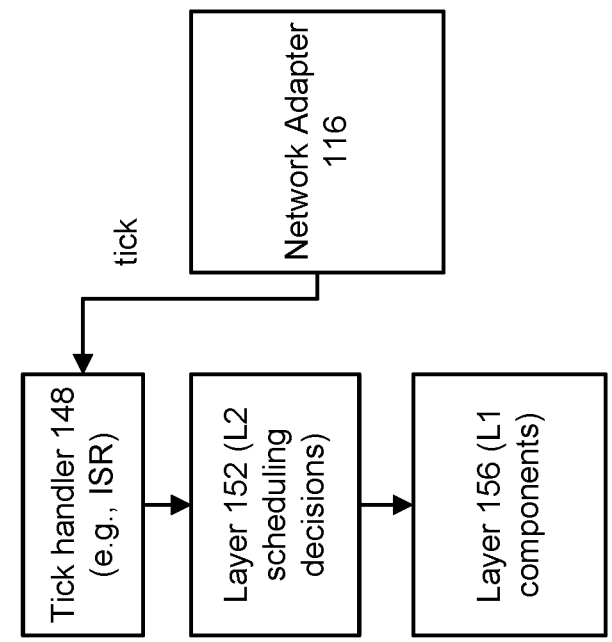
FIGS. 5A and 5B illustrate different implementations of a tick handler according to at least one example embodiment.
Figure 5A:
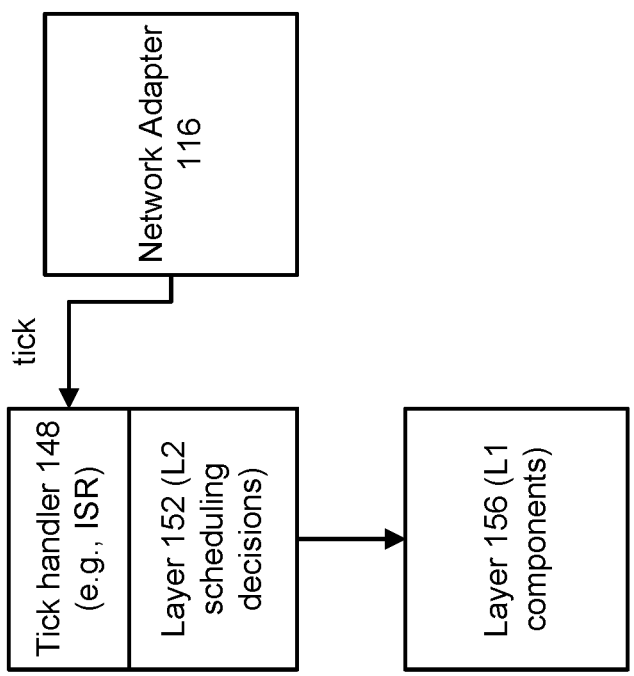

FIGS. 5A and 5B illustrate different implementations of a tick handler 148 according to example embodiments. In both of FIGS. 5A and 5B, the tick handler 148 may be implemented with an interrupt service routine (ISR). FIG. 5A illustrates a kernel space implementation for making L2 scheduling decisions and FIG. 5B illustrates a user space implementation for making L2 scheduling decisions. In FIG. 5A, the ISR is integrated with layer 152 that makes L2 scheduling decisions. In this case, receipt of the tick as an interrupt by the tick handler 148 "wakes up" the ISR and the scheduling decisions are made as part of the ISR handling the interrupt. In other words, FIG. 5A shows an example where scheduling decisions are made by a CPU thread within kernel space of the CPU 120, which may result in faster scheduling. Meanwhile, FIG. 5B illustrates an example where the tick handler 148, implemented as an ISR, is not integrated with layer 152 so that L2 scheduling decisions are made by a user space thread of the CPU 120 which may conserve kernel space processing resources.

Figure 6:
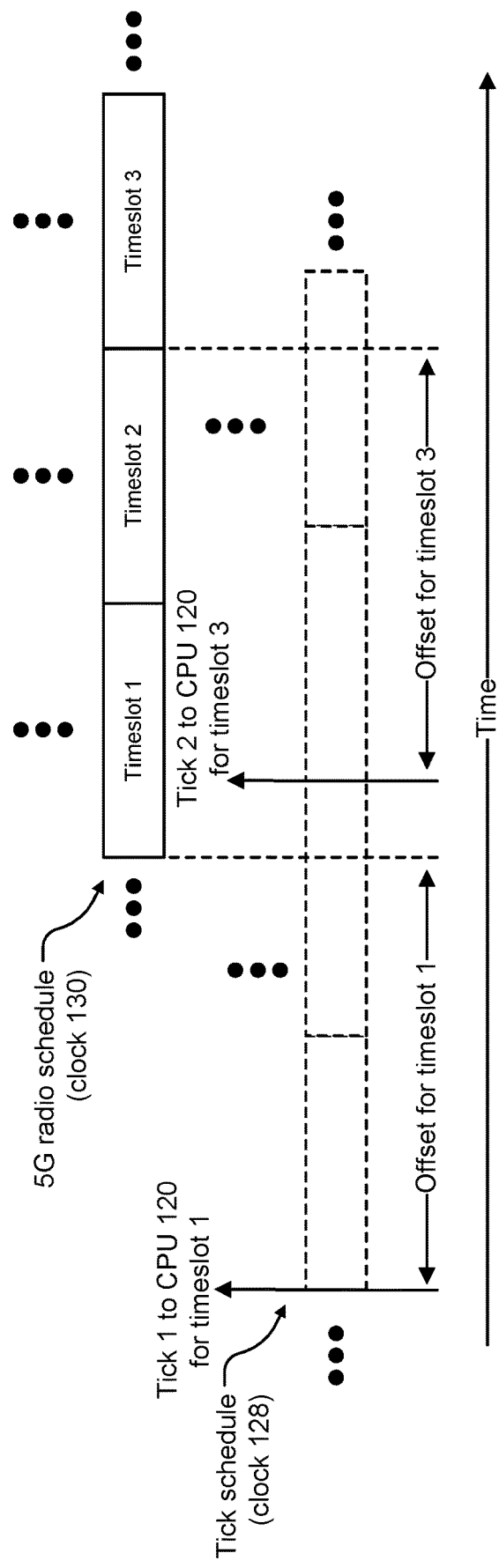
FIG. 6 illustrates tick generation according to at least one example embodiment.

FIG. 6 illustrates tick generation according to at least one example embodiment. FIG. 6 illustrates timeslots 1-3 for a radio schedule and further illustrates "a tick schedule" that indicates time or timing offsets for a tick in relation to a particular timeslot of the radio schedule. In general, it may be said that for every Nth timeslot of the radio schedule, the circuitry 132 generates a tick with some offset with respect to the corresponding timeslot (e.g., an offset with respect to the timeslot start or end time).

As may be appreciated, a time or timing offset may be predetermined (e.g., the timing offset is requested by the orchestrator 144) and/or determined on the fly by the circuitry 132. In one embodiment, a timing offset of a tick from a timeslot takes one or more types of delays into account, such as a delay associated with signal propagation from circuitry 132 to tick handler 148 and/or a network delay if other traffic is being passed over the same link as the tick. Delays associated with signal propagation may be relatively static so long as the length of the link between the circuitry 132 and the tick handler 142 remains relatively constant, and the circuitry 132 may account for static delays by sending each tick in a manner that accounts for such a static delay. Meanwhile, network traffic related delays may vary based on an amount traffic and may be periodically measured by the circuitry 132 at regular or irregular intervals. In this case, the circuitry 132 may send each tick in a manner that accounts for the most recently measured delay.

Each timeslot in the radio schedule may correspond to a time period used in a cellular network (e.g., a 5G network) to send and receive from an RU 112 and/or to schedule data for transmission or reception at a CPU 120. In other words, an RU 112 sends and receives data according to the radio schedule while a CPU 120 may schedule the send and receive operations from the RU 112 according to the tick schedule, and the tick schedule has a known relationship to (i.e., is synchronized with) the radio schedule.

The illustrated timeslots for the radio schedule may be determined according to clock 130, and clock 128 may be synchronized with the timeslots of the radio schedule (as indicated in the "tick schedule" with dashed lined rectangles). As noted above, each timeslot in the radio schedule may have a duration of 1 ms, 500 μs, 250 μs, 125 μs, 62.5 μs, or other suitable duration used for transmission and reception operations from an RU 112. In one example, each timeslot in the radio schedule has a same duration. However, example embodiments are not limited thereto, and the durations of timeslots may vary for the radio schedule depending on design preferences. For example, every other timeslot in the radio schedule may have a longer duration than the intervening timeslots. Although three timeslots are shown, additional timeslots may exist as indicated with the horizontal ellipses. As indicated by the vertical ellipses, other radio schedules (e.g., 5G radio schedules) with respective sets of timeslots of the same or varying durations as timeslots 1-3 may also exist for a particular RU 112 or a particular collection of RUs 112. Similarly, multiple tick schedules may exist so that a tick schedule exists for each radio schedule.

The tick schedule in FIG. 6 indicates timing offsets for a tick in relation to a particular timeslot of the radio schedule. In particular, FIG. 6 illustrates an example where a tick is generated by circuitry 132 and sent to the CPU 120 for every other timeslot of the radio schedule. For the sake of explanation, the dashed rectangles in the tick schedule of FIG. 6 correspond to the timeslots in 5G radio schedule where each timeslot in the radio schedule is assumed to have a same duration. As shown, tick 1 is generated and sent by the circuitry 132 for timeslot 1 at a timing offset from timeslot 1. In the example of FIG. 6, the timing offset corresponds to the time between generation of tick 1 by the circuitry 132 and a beginning of timeslot 1. In accordance with example embodiments, tick 1 causes a CPU 120 to initiate scheduling operations (e.g., layer 2 scheduling operations) for transmission and/or reception of data by the RU 112 during timeslot 1. Similarly, tick 2 is generated and sent by the circuitry 132 at a timing offset from timeslot 3 and causes the CPU 120 to initiate scheduling operations for transmission and/or reception of data by the RU 112 during timeslot 3.

As may be appreciated, the timing offset for both ticks 1 and 2 from a corresponding timeslot is the same, however, example embodiments are not limited thereto, and the timing offset between a tick and the beginning of a radio schedule timeslot may be configurable (e.g., the timing offset may vary across a particular radio schedule). The timing offset may be a design parameter set based on empirical evidence and/or preference. In one example, timing offsets for the ticks in relation to associated timeslots of the radio schedule are set based on a known or estimated amount of time taken by a CPU 120 to schedule transmission and/or reception operations for a particular timeslot. In other words, the CPU 120 spends at least part of the time period that corresponds to a timing offset scheduling data transmission and/or reception operations for transmitting and/or receiving data during the timeslot associated with the tick.

In at least one embodiment, the CPU 120 informs the circuitry 132 of how often and/or when to generate and send a tick. In other words, the CPU 120 may determine or otherwise have information about lengths of timing offsets for ticks. For example, the orchestrator 144 includes such information in the request sent through input 136 upon connection of the network adapter 136 to the CPU 120. The orchestrator 144 may determine the periodicity (e.g., steady or variable) of tick generation based on one or more factors, such as the above-mentioned estimated time taken for a CPU 120 to complete a scheduling operation for a particular timeslot, available processing resources, and/or the like. In at least one example, a tick may be generated and sent to the CPU 120 in a one-shot fashion. In this case, the circuitry 132 may generate and send a single tick to the CPU 120 to trigger one or more operations (not necessarily scheduling operations) at the CPU 120.

As noted above, the tick schedule is related to the radio schedule and indicates timing offsets for a tick in relation to a particular timeslot of the radio schedule. Although FIG. 6 illustrates that the timing offsets for ticks are shown with respect to start times of a timeslot in the radio schedule, the timing offsets may be generated based on end times of the timeslots and/or at some known time between the start and the end of a timeslot. As noted above, the radio schedule may contain timeslots of a variable duration so that, for example, every second timeslot is 1.35× longer than the other timeslots.

Figure 7:
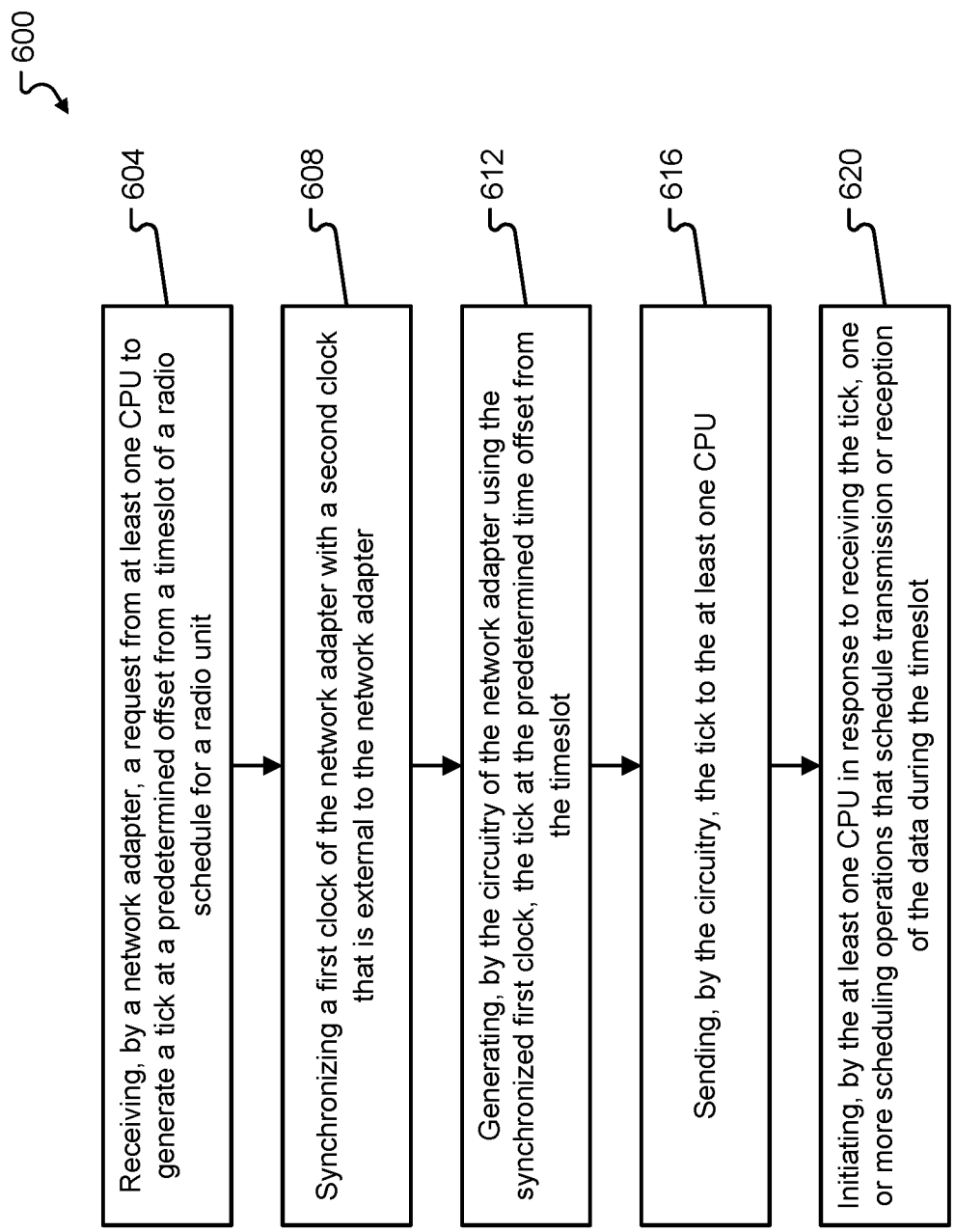
FIG. 7 illustrates a method according to at least one example embodiment.

FIG. 7 illustrates a method 600 according to at least one example embodiment. The method 600 may be performed by one or more of the elements discussed above with respect to FIGS. 1-6. Accordingly, the method 600 is discussed with reference to FIGS. 1-6. One or more operations within the method 600 may be omitted or performed in a different order than that illustrated. Other operations not explicitly illustrated may also be part of method 600.

Operation 604 includes receiving, by a network adapter 116, a request from at least one CPU 120 that prompts circuitry 132 to generate a tick at a offset from a timeslot of a radio schedule for a radio unit 112. The request may be generated by the orchestrator 144 and received by the circuitry 132 in the same manner as that discussed above with reference to other figures. The request may include information that identifies when and/or how often the circuitry 132 should generate and send a tick to a CPU 120. In at least one embodiment, the request includes information useful for authenticating a CPU 120. For example, the request may include the above discussed digital signature that includes an identifier of a host and/or a private key of a private key-public key pair. Alternatively, the entity requesting ticks from the network adapter 116 is authenticated by the network adapter 116 in another suitable fashion (e.g., by determining whether the requesting entity is connected to certain PCIe lanes of the network adapter 116).

Operation 608 includes synchronizing a first clock 128 of the network adapter 116 with a second clock 130 that is external to the network adapter 116 (and, in general, external to the at least one CPU 120). For example, in accordance with the description of FIGS. 1-5B, the clocks 128 and 130 are synchronized with one another according to a suitable technique (e.g., PTP techniques). In general, there are three options for synchronization: 1) the clock 130 of the RU 112 synchronizes to clock 128; 2) the clock 128 synchronizes to the clock 130 of the RU 112; or 3) clocks 128 and 130 synchronize to an external or third party clock (not shown in FIG. 4).

Operation 612 includes generating, by the circuitry 132 of the network adapter 116 using the synchronized first clock, a tick at the time offset from the timeslot. In general, for every Nth timeslot of the radio schedule, the circuitry 132 generates a tick with a offset from the corresponding timeslot. For example, the circuitry 132 monitors the synchronized first clock 128 to track an Nth timeslot of the radio schedule and outputs an electrical signal as the tick to output 124 at the time offset from the start of an Nth timeslot. As discussed above, each timeslot may correspond to a duration of time during which an RU 112 transmits or receives data.

Operation 616 includes sending, by the circuitry 132, the tick to at least one CPU 120. For example, the tick is sent over the channel 140.

Operation 620 includes initiating, by the at least one CPU 120 in response to receiving the tick, one or more scheduling operations that schedule transmission or reception of the date during the timeslot. For example, the tick handler 148 initiates the one or more scheduling operations within layer 152 according to the kernel space implementation or the user space implementation shown in FIGS. 5A and 5B.

As may be appreciated, example embodiments propose to offload tick generation that typically consumes an entire CPU core to a network adapter, such as a NIC, that in some cases already has accurate timing knowledge thanks to synchronization with a clock of a radio unit for other reasons. The result is more reliable and precise tick generation, which in turn, may improve performance of the system as scheduling operations triggered by ticks are also reliable and precisely timed. In addition, processing resources of the CPU may be conserved and/or power consumption of the system may be reduced because the CPU need not dedicate a whole or partial core to tracking time for the purpose of tick generation. Although example embodiments have been shown and described with respect to a 5G network, inventive concepts may be applied to other types of networks (e.g., 4G LTE networks, 3G networks, datacenter switching networks). These and other advantages and practical applications should be apparent to one of ordinary skill in the art.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:
(1) A network adapter, comprising:
an output that couples to a central processing unit (CPU) of a network device;
a first clock coupled to the output and configured to be synchronized with a second clock that is external to the CPU and the network adapter; and
circuitry coupled to the first clock and configured to:
generate, using the synchronized first clock, a tick at a time offset from a timeslot of a radio schedule for a radio unit; and
send the tick to the output.
(2) The network adapter of (1), further comprising:
an input configured to receive a request from the CPU that prompts the circuitry to generate the tick at the time offset.
(3) The network adapter of one or more of (1) to (2), wherein the input receives the request after connection of the input to the CPU.
(4) The network adapter of one or more of (1) to (3), wherein a duration of the timeslot is based on a standard used for wireless communication.
(5) The network adapter of one or more of (1) to (4), wherein the first clock and the second clock are synchronized to a third clock external to the first clock and the second clock.
(6) The network adapter of one or more of (1) to (5), wherein the tick is implemented as an interrupt for the CPU.
(7) The network adapter of one or more of (1) to (6), wherein the interrupt initiates one or more scheduling operations at the CPU for scheduling transmission or reception of data.

(8) The network adapter of one or more of (1) to (7), wherein the first clock is configured to be synchronized with the second clock using Precision Time Protocol (PTP).

(9) The network adapter of one or more of (1) to (8), wherein the timeslot is one of multiple timeslots of the radio schedule, and wherein the circuitry generates ticks at time offsets from selected ones of the multiple timeslots.

(10) The network adapter of one or more of (1) to (9), wherein the output couples to one or more additional CPUs to provide one or more additional ticks to the one or more additional CPUs.

(11) A network device, comprising:
a CPU; and
a network adapter including:
an output that couples to the CPU;
a first clock coupled to the output and configured to be synchronized with a second clock that is external to the network adapter and the CPU; and
circuitry coupled to the first clock and configured to:
generate, using the synchronized first clock, a tick at a time offset from a timeslot of a radio schedule for a radio unit; and
send the tick to the CPU through the output to cause the CPU to initiate one or more scheduling operations for the timeslot.

(12) The network device of (11), further comprising:
a channel that passes the tick from the output to the CPU.

(13) The network device of one or more of (11) to (12), wherein the network adapter further comprises:
an input configured to receive a request from the CPU that prompts the circuitry to generate the tick at the time offset.

(14) The network device of one or more of (11) to (13), wherein the CPU is configured to generate the request upon connection of the CPU to the input of the network device.

(15) The network device of one or more of (11) to (14), wherein a duration of the timeslot is based on one or more standards for wireless communication in a 5G cellular network.

(161) The network device of one or more of (11) to (15), further comprising:
the radio unit, wherein the radio unit includes the second clock and one or more antennas that wirelessly transmit or receive data.

(17) The network device of one or more of (11) to (16), further comprising:
one or more additional CPUs, wherein the output of the network adapter provides the tick to authenticated CPUs of the one or more additional CPUs.

(18) A method, comprising:
synchronizing a first clock of a network adapter with a second clock that is external to the network adapter;
generating, by circuitry of the network adapter and using the synchronized first clock, a tick at a time offset from a timeslot of a radio schedule for a radio unit; and
sending, by the circuitry, the tick to at least one CPU of a network device coupled to the network adapter.

(19) The method of (18), further comprising:
receiving, by the network adapter, a request from the at least one CPU that prompts the circuitry generate the tick, wherein the request includes information that identifies the time offset and information that the network adapter uses to authenticate the at least one CPU.

(20) The method of one or more of (18) to (19), further comprising:
initiating, by the at least one CPU in response to receiving the tick, one or more scheduling operations that schedule the transmission or reception of data during the timeslot.

What is claimed is:

1. A network adapter, comprising:
an output that couples to a central processing unit (CPU) of a network device through a communication bus;
a first clock coupled to the output and configured to be synchronized with a second clock of a radio unit that is external to the CPU and the network adapter, the radio unit being configured to wirelessly communicate with user equipment;
an input to receive a request from the CPU, the request including information that identifies a time offset from a time window of a radio schedule of the radio unit; and
circuitry coupled to the first clock and to:
generate, using the synchronized first clock, a tick; and
send the tick to the CPU through the output and over the communication bus at the time offset from the time window of the radio schedule such that the tick causes the CPU to perform one or more scheduling operations between a time that the CPU receives the tick and a beginning of the time window, wherein the one or more scheduling operations schedule data for wireless transmission or reception by the radio unit to or from the user equipment during the time window.

2. The network adapter of claim 1, wherein request includes information that the network adapter uses to authenticate the CPU to the network adapter.

3. The network adapter of claim 1, wherein the input receives the request after connection of the input to the CPU.

4. The network adapter of claim 1, wherein a duration of the time window is based on a standard used for wireless communication.

5. The network adapter of claim 1, wherein the first clock and the second clock are synchronized to a third clock external to the first clock and the second clock.

6. The network adapter of claim 1, wherein the tick is implemented as an interrupt for the CPU.

7. The network adapter of claim 1, wherein the tick is implemented as a memory write.

8. The network adapter of claim 1, wherein the first clock is to be synchronized with the second clock using Precision Time Protocol (PTP).

9. The network adapter of claim 1, wherein the time window is one of multiple time windows of the radio schedule, and wherein the circuitry generates and sends ticks at time offsets from selected ones of the multiple time windows.

10. The network adapter of claim 1, wherein the output couples to one or more additional CPUs to provide one or more additional ticks to the one or more additional CPUs.

11. A network device, comprising:
a communication bus;
a CPU; and
a network adapter including:
an output that couples to the CPU through the communication bus;
a first clock coupled to the output and to be synchronized with a second clock of a radio unit that is external to the network adapter and the CPU, the radio unit being configured to wirelessly communicate with user equipment;

an input to receive a request from the CPU, the request including information that identifies a time offset from a time window of a radio schedule of the radio unit; and circuitry coupled to the first clock and to:
generate, using the synchronized first clock, a tick; and
send the tick to the CPU through the output and over the communication bus at the time offset from the time window of the radio schedule such that the tick causes the CPU to perform one or more scheduling operations between a time that the CPU receives the tick and a beginning of the time window, wherein the one or more scheduling operations schedule data for wireless transmission or reception by the radio unit to or from the user equipment during the time window.

12. The network device of claim 11, wherein the communication bus comprises a dedicated channel that passes the tick from the output to the CPU.

13. The network device of claim 11, wherein the request includes information that the network adapter uses to authenticate the CPU.

14. The network device of claim 11, wherein the CPU is to generate the request upon connection of the CPU to the input of the network adapter.

15. The network device of claim 11, wherein a duration of the time window is based on one or more standards for wireless communication in a 5G cellular network.

16. The network device of claim 11, further comprising:
the radio unit, wherein the radio unit includes one or more antennas that wirelessly transmit or receive the data.

17. The network device of claim 16, further comprising:
one or more additional CPUs, wherein the output of the network adapter provides the tick to authenticated CPUs of the one or more additional CPUs.

18. A method, comprising:
synchronizing a first clock of a network adapter with a second clock of a radio unit that is external to the network adapter, the radio unit being configured to wirelessly communicate with user equipment;
receiving, by the network adapter, a request from at least one CPU connected to the network adapter and the radio unit, wherein the request includes:
information that identifies a time offset from a time window of a radio schedule of the radio unit; and
information that the network adapter uses to authenticate the at least one CPU;
generating, by circuitry of the network adapter and using the synchronized first clock, a tick; and
sending, by the circuitry over a communication bus, the tick to the at least one CPU at the time offset from the time window of the radio schedule, such that the tick causes the at least one CPU to perform one or more scheduling operations between a time that the at least one CPU receives the tick and a beginning of the time window, wherein the one or more scheduling operations schedule data for transmission or reception by the radio unit to or from the user equipment during the time window.

19. The method of claim 18, further comprising:
generating, by the at least one CPU, the request upon connection to the network adapter.

20. The method of claim 18, further comprising:
initiating, by the at least one CPU in response to receiving the tick, the one or more scheduling operations.

* * * * *